United States Patent
Levy

(10) Patent No.: US 7,231,176 B2
(45) Date of Patent: Jun. 12, 2007

(54) METHODS AND SYSTEM FOR RETRIEVING MUSIC INFORMATION FROM WIRELESS TELECOMMUNICATION DEVICES

(76) Inventor: Jeffrey Levy, 6 Flynn St., Natick, MA (US) 01760

( * ) Notice: Subject to any disclaimer, the term of this patent is extended or adjusted under 35 U.S.C. 154(b) by 0 days.

(21) Appl. No.: 11/051,740

(22) Filed: Feb. 4, 2005

(65) Prior Publication Data

US 2005/0176366 A1     Aug. 11, 2005

Related U.S. Application Data

(60) Provisional application No. 60/542,476, filed on Feb. 6, 2004.

(51) Int. Cl.
*H04H 1/00*     (2006.01)

(52) U.S. Cl. ..................... 455/3.01; 455/3.04

(58) Field of Classification Search ...... 455/3.01–3.06, 455/186.1, 166.2, 150.1, 154.1
See application file for complete search history.

(56) References Cited

U.S. PATENT DOCUMENTS

| | | | |
|---|---|---|---|
| 5,408,686 A * | 4/1995 | Mankovitz | 455/66.1 |
| 5,594,779 A | 1/1997 | Goodman | |
| 5,661,787 A | 8/1997 | Pocock | |
| 5,694,455 A | 12/1997 | Goodman | |
| 6,029,064 A | 2/2000 | Farris et al. | |
| 6,204,862 B1 | 3/2001 | Barstow et al. | |
| 6,233,682 B1 | 5/2001 | Fritsch | |
| 6,236,832 B1 | 5/2001 | Ito | |
| 6,253,069 B1 | 6/2001 | Mankovitz | |
| 6,259,892 B1 | 7/2001 | Helferich | |
| 6,314,426 B1 | 11/2001 | Martin et al. | |
| 6,462,646 B2 | 10/2002 | Helferich | |
| 6,496,802 B1 | 12/2002 | Van Zoest et al. | |
| 6,505,160 B1 * | 1/2003 | Levy et al. | 704/270 |
| 6,507,727 B1 | 1/2003 | Henrick | |
| 6,516,466 B1 | 2/2003 | Jackson | |
| 6,560,454 B2 | 5/2003 | Helle et al. | |
| 6,609,105 B2 | 8/2003 | Van Zoest et al. | |
| 6,628,928 B1 | 9/2003 | Crosby et al. | |
| 2002/0010740 A1 | 1/2002 | Kikuchi et al. | |
| 2002/0028665 A1 | 3/2002 | Mankovitz | |
| 2002/0048224 A1 | 4/2002 | Dygert et al. | |
| 2002/0049037 A1 | 4/2002 | Christensen et al. | |
| 2002/0065066 A1 | 5/2002 | Takagaki | |
| 2002/0090936 A1 | 7/2002 | Sauriol et al. | |
| 2002/0133477 A1 * | 9/2002 | Abel | 707/1 |
| 2002/0147004 A1 | 10/2002 | Ashmore | |

(Continued)

FOREIGN PATENT DOCUMENTS

JP     2003-125098     4/2003

(Continued)

*Primary Examiner*—Matthew D. Anderson
*Assistant Examiner*—Perez M. Angelica
(74) *Attorney, Agent, or Firm*—Burns & Levinson LLP; Yan Lan

(57) ABSTRACT

A real-time music information retrieval system and methods for providing desired music information via text message to radio or television stations listeners through wireless communication devices. Listeners could retrieve information for the song that is currently being played at the radio and television station, or the songs that have previously been played. A system and method is provided to automatically send an alert message the radio and television station listeners of upcoming music broadcasting events.

12 Claims, 1 Drawing Sheet

U.S. PATENT DOCUMENTS

| | | |
|---|---|---|
| 2002/0183042 A1 | 12/2002 | Thornton |
| 2002/0183059 A1 | 12/2002 | Noreen et al. |
| 2003/0050058 A1* | 3/2003 | Walsh et al. ................. 455/426 |
| 2003/0060157 A1* | 3/2003 | Henrick ..................... 455/3.04 |
| 2003/0153264 A1* | 8/2003 | Osato et al. ............... 455/3.06 |

FOREIGN PATENT DOCUMENTS

| | | |
|---|---|---|
| WO | WO 02/052540 | 7/2002 |
| WO | WO 03/034433 | 4/2003 |

* cited by examiner

METHODS AND SYSTEM FOR RETRIEVING MUSIC INFORMATION FROM WIRELESS TELECOMMUNICATION DEVICES

PRIORITY

This application relates to and claims priority under 35 U.S.C 109(e) from U.S. Provisional Application Ser. No. 60/542,476, filed Feb. 6, 2004, entitled "Methods And Apparatus For Retrieving Music Information From Wireless Telecommunication Devices", which is hereby incorporated by reference in the entirety.

FIELD OF THE INVENTION

This invention relates generally to information distribution and, more particularly, to methods and system for allowing radio station listeners and television viewers to retrieve music information directly from their wireless telecommunication devices such as cellular telephones. Additional functionality will be delivered to further enhance this interactive experience.

BACKGROUND OF THE INVENTION

Radio broadcasting is considered a very influential medium, owing to its very large audience. It is a very common situation that when hearing an interesting song from a particular radio station, one will wonder and often be eager to know exactly who and what he is listening to. In addition, the listeners naturally want to know other information related to the song, such as the album name and artist. Years ago this did not present a problem for the radio station. Disk Jockeys would announce song information either before or after the song played. However, in recent years, with the pressure to increase the commercial advertising spot load and use of innovative listener promotions, time has not been allocated to providing this information to listeners.

When one loves music, it is not enough to just listen to it blindly. If a listener hears an interesting song during a radio or television station broadcasting, but has no idea about what song that is and who is the artist, that person would have to try to remember the song and the station name and probably the time and date the song is played and sends inquires about the song to the radio or television station. In response to the inquiries, some radio and television station answer some of the inquiries by email or on their web sites. However, due the volume of the inquiries and other reasons, the normal response time to such inquiries can run from weeks to months and the waiting is frustrating.

It is therefore desirable to provide a system and methods that provide the radio and television stations listeners with the information they desire without impacting the stations' desire to maintain their advertising spot levels.

SUMMARY OF THE INVENTION

The present invention relates to a real-time music information retrieval system and methods for providing desired music information to radio or television stations listeners through wireless communication device.

According to one aspect of the invention, a system is provided that allows radio or television stations listeners to retrieve music information for songs that have previously been played at the station within a specified time period.

According to another aspect of the invention, a system and method is provided for allowing radio or television stations listeners to retrieve music information directly through their wireless telecommunication devices for a song that is currently being played at the station.

In accordance with another aspect of the invention, a real-time music information retrieval system is provided having a broadcast receiver for receiving broadcast transmissions from broadcasters, and a wireless communication device capable of transmitting and receiving text messages, and a control system for generating and transmitting text message replies containing the requested music information to the radio and television station listener through the listener's wireless communication device. The system includes an interface to a plurality of radio and television station databases to monitor and retrieve song information, and a central database containing songs information, broadcasting schedules of individual radio and television station, and any specialized program information.

In accordance with the present invention, a method is provided for allowing radio or television station listeners to obtain music information via text message directly through their wireless communication device, including receiving request information from a caller through a wireless communication device during or immediately following a radio or television station music broadcasting. The request information contains at least in part an identification that is associated with each individual station, and information to identify the caller which normally includes the phone number of the mobile communication device and the date and time of the call. Using the request information from the caller to identify the station responsible for the broadcast, an appropriate text message reply is formulated, which is then transmitted to the mobile caller.

According to another aspect of the invention, a method is provided to automatically alert the listeners of a radio station of the upcoming broadcasting events. The radio and television stations listeners could subscribe to the system by registering online or by sending a text message to a predetermined Shortcode. Listeners could set up requests for which stations and songs or artists they wish to be notified about, and request to be notified through their wireless telecommunication device shortly before the songs are to be played at the station.

DESCRIPTION OF THE PREFERRED EMBODIMENT

Figure 1:
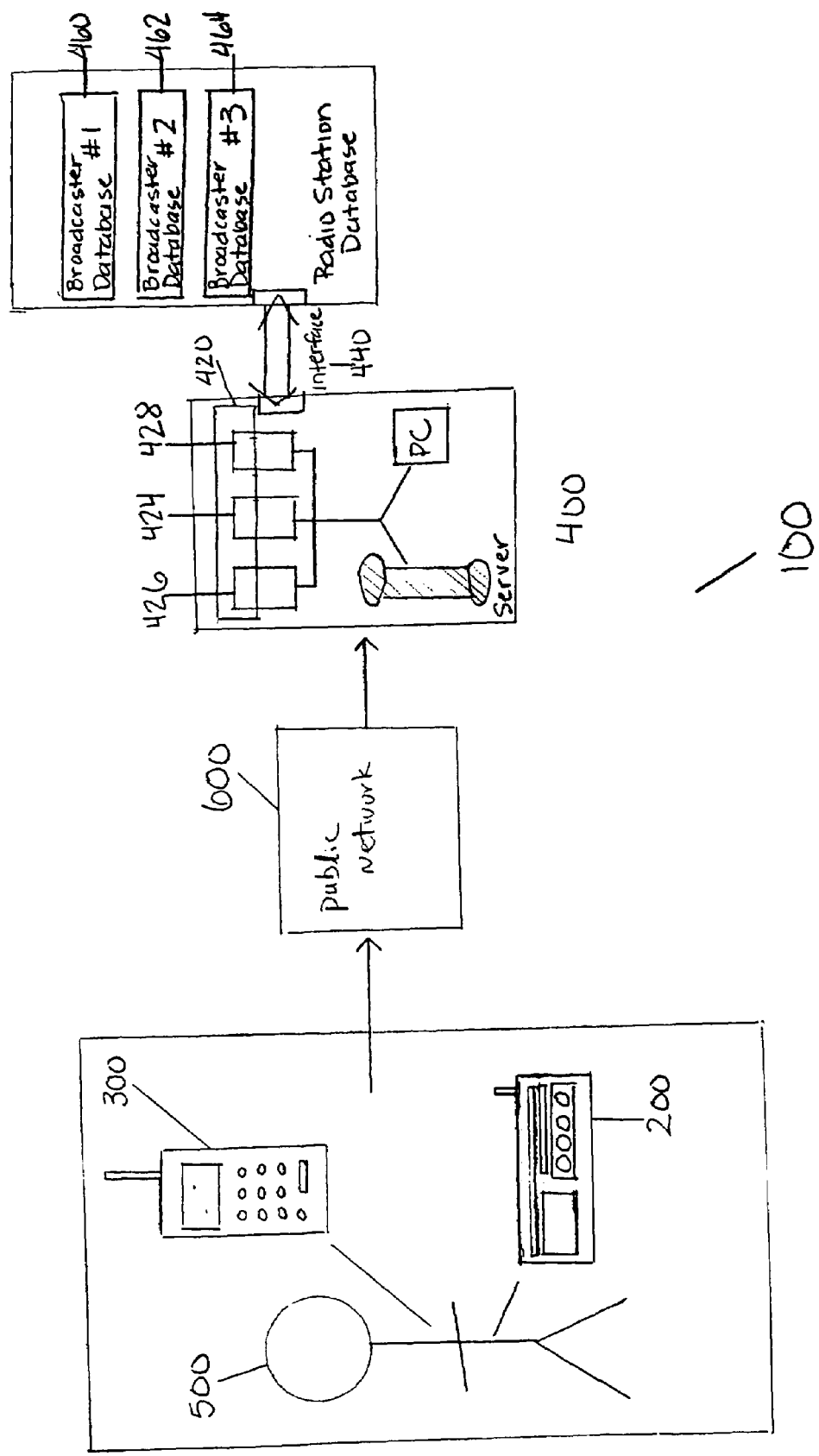
FIG. 1 is a block diagram showing a schematic structure of an example of a real-time music information retrieval system according to the invention.

FIG. 1 illustrates a real-time music information retrieval system 100 having a broadcast receiver 200 for receiving broadcast transmissions from broadcasters, a wireless communication device 300 capable of transmitting and receiving text messages to and from the system, an interface to public network 600, and a control system 400 for generating and transmitting text message replies containing the requested music information to the radio and television station listener 500. The control system 400 may include a central database 420 containing songs information and data for upcoming broadcasting events and broadcasting schedules of individual radio and television station, and an interface 440 to a plurality of radio and television station databases 460, 462, 464, to monitor and retrieve song information upon request. The control system 400 may also include a database 424 for storing subscribers' information and an answering system 426 for receiving and processing listeners' requests. The control system 400 may be further expanded to include a database 428 for storing song fingerprints.

In a preferred embodiment, the broadcasts are AM or FM radio broadcasts. The broadcast receiver could be a conventional AM/FM radio receiver, a digital radio or similar device, such as a mobile satellite radio or an AM/FM automobile radio. The wireless communication device 300 is a two-way wireless communication device capable of transmitting text messages, such as a wireless mobile telephone, a Blackberry-like device, or any other PDA-type devices. The user of the wireless communication device is a subscriber of the real-time music retrieval system. Depending upon the particular implementation, the subscriber may be charged a fee for accessing the real-time music retrieval system. Alternatively, the subscriber may be able to access the system without paying a fee. In still other implementations, users of the real-time music retrieval system do not necessarily need to subscribe to the system.

The system 100 includes an interface 440 to radio and television station's databases 460, 462, 464, allowing the system 100 to monitor and to receive real-time information from a plurality of radio and television stations of their broadcasting information, e.g., song title, artist, album information, time, station information, record label or other specialized programming.

The system includes an interface automatically querying information from affiliated radio and television stations for continuously monitoring which songs are in cue (playing next) and which song is presently playing on-air. The system decodes the stream of songs, reformats the data into a format such as XML, and provides the data to a central database 420 in a standard format (for example, song title, artist, and time, and next song to play). The system then locates any listeners in the system whose preferences for these alerts match the upcoming broadcasting events. When a positive match is detected, the system will generate an alert message and automatically sends to the listeners at the wireless mobile devices. The alert message could be a SMS (short message service) text message, photo or any other multimedia messages.

According to one embodiment of the invention, when requesting song information, the listener needs to dial a designated phone number (e.g., a toll free phone number, or a local phone number). The listener is then prompted by voice to enter the station identification which normally is a predetermined identification code assigned to each individual station (for example, "972" for radio station Wash FM 97.2"). The use of a portion of the channel frequency is a convenient way to identify a particular broadcaster since the listeners normally know such information well or such information is readily accessible to the listeners. However, the station identification does not have to be associated with the channel frequency according to the invention. Unique identification maybe assigned to the stations, for example, using "WAS" for radio station Wash FM 97.2. The unique identifiers for each broadcasting station may also be a combination of any numbers and/or words that does not have to be associated with the channel frequency.

According to another embodiment of the invention, a unique station-specific toll-free or local telephone number is assigned to each individual broadcasting station, so that the listener only needs to dial the station specific-telephone number when requesting song information.

According to another embodiment of the invention, the listener, when requesting song information, could send the request via a text message to a pre-established short code (for example, a SMS short code "FM411"). For example, listener #1 wants to know the title of the song that is currently playing at radio station Wash FM 97.2. Listener #1 composes a message containing the station identification "WAS" and sends it to "FM411". When desired, a plurality of short codes maybe used and applied to perform different functions. The pre-established short code could be a SMS short code or in form of a standard ten digits telephone number.

Once the request is received, the system identifies the particular song requested by the listener by matching the station identification and the date and time of the request against the database of songs and station programming. Once the song has been matched and identified, the system formulates a reply pertaining to the requested music information to the listener through the listener's wireless communication device. The listener will then receive a text message identifying the song title and artist name, album name, and/or other information related to the song and artist. The reply message could be a text message, photos, or any other multimedia messages. The reply message could be stored at the listener's wireless communication device so that the listener could refer to it at a later date or forward it to others.

The time in which the listener receives the text message reply will vary by mobile telephone carrier and network congestion, and can range from a few seconds to ten minutes on average.

Depending upon the particular implementation, the listener may receive the reply text message during the telephone call. Alternatively, an automatic voice message will be generated by the system informing the listener that the request has been acknowledged so that the listener could terminate the call. The listener will receive a text message reply shortly.

In one embodiment of the invention, station identification code is not required to retrieve song information. When requesting the song information, the listener needs only dial a designated toll free phone number and hold the wireless communication device to the radio for a short period of time whereupon the song's fingerprint is transmitted to the system. The fingerprint is then matched with a database containing song fingerprints. Upon a positive match, the system then formulates a reply including the song title, artist name and album information and transmits the reply to the listener as a text message through the listener's wireless communication device.

In a typical implementation, the listeners only need to hold the wireless communication device to the radio for few seconds while the system is searching and matching the song fingerprints in the database. The time in which the listener receives the text message will vary by mobile telephone carrier and network congestion, and can range from instantaneously to few minutes on average.

It should be noted that the listener could obtain information for the song that is currently being played at the radio station, or the songs that have previously been played. Depending upon the particular implementation, the initial reply message may contain both the current and previous played songs.

In one embodiment of the invention, the system has several pre-determined commands that the listener may use to activate other functions of the service. Examples of the commands include but are not limited to the followings:

PREV for previous song, NEXT for next song, BUY to purchase the CD or song, and VOTE to vote on the song. Some of these commands will require additional information from the listeners and would require pre-registration. When request song information, the listener could include a command with the station identifier. By assigning a command "Previous" before the station identification number, the listener can receive a short history of songs that have been played at the station, for example within the past hour.

In a preferred embodiment of the invention, a method is provided to automatically alert the listeners of a radio station of the upcoming broadcasting events. The listener is a subscriber of the real-time music retrieval system. By registering online at the designated website, the listener can create a customized profile containing a personalized song playlist of favorite songs and artists or other specialized station programming, and request to be notified prior to the broadcast of the selected songs.

The system includes an interface automatically querying information from affiliated radio and television stations for continuously monitoring which songs are in cue (playing next) and which song is presently playing on-air. The system decodes the stream of songs, reformats the data into a format such as XML, and provides the data to a central database in a standard format (for instance, song title, artist, and time, and next song to play). The system then locates any listeners in the system whose preferences for these alerts match the upcoming broadcasting events. When a positive match is detected, the system will generate an alert message and automatically sends to the listeners at the wireless mobile devices. The alert message could be a SMS (short message service) text message, photo or any other multimedia messages.

In a preferred embodiment of the invention, the subscribers could share their personalized song playlists with other people who are also subscribers of the system. For example, listener #1 is a subscriber of the system. Upon signing up listener #1 can also sign up friends who are also subscribers of the system to be on his favorites list. Shortly (for example, two minutes) prior to the song being played at the station, the friends of listener #1 will also be notified via text message that the song will be played.

In other implementations, the subscribers could share their personalized song play lists with other people who do not necessarily need to subscribe to the system.

In yet other implementation, the listeners do not have to subscribe to the system in order to receive the alerting service.

According to one embodiment of the invention, the system may provide a service whereby listeners may update their alerts list without having to subscribe to the system or to log onto the designated website. The station has the option to identify a song on-air that listeners can place the song in their alerts automatically. For example, the station may choose to promote a particular song and have the DJ announce a special song code of the song prior and/or after the song broadcasting. When the listener hears the song code on-air and wishes to add that song to his alerts, the listener could send a text message containing the song code together with a command (i.e. "ALERT") to a pre-determined Shortcode, in which case the song name and the artist information will be automatically added into the listener's alert list. The listener will in the same way be notified via text message shortly prior to broadcasting of what station the song, artist, or song from a particular album is going to be played. The time in which the listener receives the alert message will vary and can range from instantaneously to ten minutes on average.

In yet another embodiment of the invention, public playlists are available for subscription. Listeners are subscribers of the real-time music retrieval system. When selected, the listeners will automatically be notified through their wireless communication device prior to the broadcasting of the songs from the public playlist. Depending upon the particular implementation, the subscriber may be charged a fee for accessing the real-time music retrieval system. Alternatively, the subscriber may be able to access the system without paying a fee. In still other implementations, users of the real-time music retrieval system do not necessarily need to subscribe to the system.

The listeners can also set up with the system and request to be notified when new songs are released and played by their chosen favorite artists. According to one embodiment of the invention, when the system detects a match and sends an alert message to the listener that a selected song will be on-air in few minutes, the system will attach supplemental information related to the song with the alert message, i.e., Concert and CD release dates. Depending on the implementation, purchase information including telephone number could be embedded in the alert message so the listener only needs to press SEND to connect for the option to purchase.

In another embodiment of the invention, third-parties including other listeners and music artists can share their alerts and/or simplify the process of adding their alert to the listener's alerts by several methods. For example, a link to the system allowing automatically adding the songs and artists to the listener's favorite playlist would be available. With one click, the artist or artist's songs would be added to the listener alerts. The system also allows artists to send personalized text messages. When a favorite listed artist is being played, the listeners would receive an alert message from that artist asking them to listen and appended to the alert message could be a personal message from the artist. For example, the artist may send an inspirational quote or political message.

In another embodiment of the invention, the system may provide a service whereby the listeners could send personal messages with a song request. Listener #1 can choose a song from a playlist. Listener #1 could request the system to send an alert message to his friends notifying them of the song being played along with a personal message from the listener #1. For example, listener #1 wants to dedicate a song to listener #2 and wants to deliver a personal message to listener#2 when the song is played. Listener #1 would set up a request with the system and write a personal message. This could be done either through the designated website or through the phone. Once a match is detected within Listener #2's geography, the system will send an alert message to Listener #2 shortly prior to the song being played and attach to the alert message the personal message from Listener #1. Additionally, one option may be for a phone number to be attached to the message which when called by Listener #2 would play a message which Listener #1 recorded previously. The personal message could be a text message, or photo or any other multimedia messages.

The system may also provide service whereby the listener# 1 can choose to be notified when the dedicated song is delivered. Note that Listener #1 and Listener #2 do not need to be within the same geography. Regardless of their physical location, the system will search all songs playing across the entire network in Listener #2's geography.

In another embodiment of the invention, the system may provide a service whereby the listeners can request to be notified when their favorite artists will be releasing show dates in their area and when tickets can be purchased via cell phone.

In another embodiment of the invention, the system may provide a service whereby the listener can also choose their top radio stations and be entered into contests and eligible for free gifts.

In another embodiment of the invention, the system may provide a service whereby the system invites the listeners to vote for a particular song, program or other issues of interest. When generating the reply message, the system may also includes an appended message from the station asking the listeners to provide feedback from their cell phone whether they would like to hear more or less of that particular song. The listeners can also sign up to be a daily voter for a special station charts such as the top 10 countdown via their cell phone. Listeners can also sign up to vote for any new song added to the station's play list.

In another embodiment of the invention, the system may provide a service allowing record companies to run promotions. The record label would identify an artist to promote. Listeners who have placed that artist on their alert lists would receive an email or a text message notifying the listener of the promotion. When that new artist or song is played, the first x listeners to tag it would receive a discount. Record labels also can run promotions where they identify songs or artists they wish to promote and the corresponding songs or artists where they will be promoted. For example, the system will allow the record label to choose the new song from an existing artist to promote. Whenever a song from the same artist is either requested by a listener for identification or the upcoming play is alerted to the listener, a promotional message is attached to the text message promoting the new song.

In another embodiment of the invention, the system may provide a service assisting radio and television station to run contests where the questions are sent to the listeners via text message. The listener must listen to the station for a defined period of time to retrieve the answer to the question or a particular song to be played. The answer may be in a multiple-choice format so it's easy for the listener to text back the answer.

In another embodiment of the invention, the system may provide a service allowing the listener to purchase the song or CD from their cell phone. Upon receiving a text message with the song, artist, or album information, the listener can signify their intent to purchase the song or album by returning a text message with a pre-established command to purchase. The listener is a subscriber of the system. The listener's personal information including the necessary information required to place a purchase order is pre-stored in the system's secured database.

In another embodiment of the invention, the system may provide a service allowing the listeners to have a personal page on the system website which consolidates all music which has been requested by the listeners from their cell phone.

In another embodiment of the invention, the system may provide a service includes the ability for a listener, website, or listener's web log to sign-up to receive a RSS feed of song data for a chosen set of stations. Such data may include the current song, artist, and album playing on the stations selected, or it may present current songs showing the number of votes each one has collected. This may also include album artwork. Other data may include top requested song, and next song to play.

In accordance with the present invention, a method is provided for allowing radio or television station listeners to retrieve music information directly through their wireless mobile device, including receiving request information from a wireless mobile caller during or immediately following a radio or television station music broadcasting. The request information contains in part an identification code that is associated with each individual station, and may also contain information to identify the caller which normally includes the phone number of the mobile device, and the date and time of the call.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for providing notification about music information associated with songs that are in cue to be played to radio or television station listeners through a wireless mobile device capable of receiving text message, wherein the music is to be broadcasted by the station in a specified time period, the method comprising:
   receiving and storing a plurality of requests for alert messages regarding future music broadcasting, the requests including a plurality of identifiers associated with persons to whom an alert message is to be communicated prior to the broadcasting;
   formulating a plurality of queries based on the plurality of received requests;
   instantaneously retrieving from a plurality of radio and television station databases real-time cueing music information associated with songs that are in cue to be played at each of the plurality of radio and television station and storing the real-time cueing music information in a central database;
   in response to the plurality of formulated queries, retrieving from the central database, the real-time cueing music information associated with songs that are in cue to be played;
   formulating text-based alert messages; and
   communicating the text-based alert messages to one or more radio or television station listeners through wireless communication devices capable of receiving text messages using individual identifiers to identify persons to whom said alert message is to be communicated.

2. The method of claim 1, wherein the plurality of requests is submitted by the radio or television station listener by text massaging in a plurality of predetermined song codes.

3. The method of claim 1, further comprising the step of generating a playlist based upon the plurality of requests for the further music broadcasting.

4. The method of claim 1, wherein the alert message is communicated to a person who submitted the request.

5. The method of claim 1, wherein the alert message is communicated to a plurality of recipients identified by a person who submitted the request.

6. The method of claim 5, wherein a supplemental notification is generated and communicated to the person who submitted the request after the alert message is communicated to the plurality of recipients.

7. The method of claim 1, further including the step of receiving a plurality of personal messages to be communicated with the alert message.

8. The method of claim 7, wherein the plurality of personal messages is a voice message, a text message, a photo, or a multimedia message.

9. The method of claim 1, wherein the plurality of requests is submitted by the radio or television station listener through a designated website.

10. The method of claim 1, further including the step of generating a plurality of supplemental messages to be communicated with the alert message.

11. The method of claim 7, wherein the plurality of personal messages is communicated with the alert message to a plurality of recipients identified by a person who submitted the request.

12. A system for providing notification about music information associated with songs that are in cue to be played to a radio or television station listener through a wireless communication device, the system comprising:

i) a broadcast receiver for receiving broadcast transmissions from a plurality of radio or television stations;
ii) a wireless communication device capable of transmitting and receiving text messages; and
iii) a control system for generating and transmitting a text message reply containing music information to the radio and television station listener;
   wherein the control system includes,
   a) a central database containing real-time enema music information;
   b) an interface digitally connected to a plurality of radio and television station databases for instantaneously retrieving from each of the plurality of radio and television station databases real-time cueing music information associated with songs tat are in cue to be played at each of the plurality of radio and television station and Storing the real-time cueing music information in the central database; and
   c) means for generating and transmitting a textual alert message to a plurality of pre-identified recipients.

* * * * *

UNITED STATES PATENT AND TRADEMARK OFFICE
CERTIFICATE OF CORRECTION

| | | |
|---|---|---|
| PATENT NO. | : 7,231,176 B2 | Page 1 of 1 |
| APPLICATION NO. | : 11/051740 | |
| DATED | : June 12, 2007 | |
| INVENTOR(S) | : Jeffrey Levy | |

It is certified that error appears in the above-identified patent and that said Letters Patent is hereby corrected as shown below:

In column 10 line 9 "enema" should read --cueing--

Signed and Sealed this

Twenty-first Day of August, 2007

JON W. DUDAS
*Director of the United States Patent and Trademark Office*